US012459449B2

(12) United States Patent
Matano et al.

(10) Patent No.: US 12,459,449 B2
(45) Date of Patent: Nov. 4, 2025

(54) WIRE HARNESS ROUTING STRUCTURE FOR CHARGEABLE VEHICLE

(71) Applicants: Nissan Motor Co., Ltd., Kanagawa (JP); RENAULT S.A.S., Boulogne-Billancourt (FR)

(72) Inventors: Shinichi Matano, Kanagawa (JP); Yuji Ishii, Kanagawa (JP); Hidenori Abe, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 410 days.

(21) Appl. No.: 17/922,186

(22) PCT Filed: Apr. 28, 2020

(86) PCT No.: PCT/IB2020/000410
§ 371 (c)(1),
(2) Date: Oct. 28, 2022

(87) PCT Pub. No.: WO2021/220029
PCT Pub. Date: Nov. 4, 2021

(65) Prior Publication Data
US 2023/0202408 A1    Jun. 29, 2023

(51) Int. Cl.
| | |
|---|---|
| *B60R 16/033* | (2006.01) |
| *B60K 1/04* | (2019.01) |
| *B60L 53/16* | (2019.01) |
| *B60L 53/18* | (2019.01) |
| *B60R 16/02* | (2006.01) |
| *H01R 13/73* | (2006.01) |

(Continued)

(52) U.S. Cl.
CPC ............ *B60R 16/0215* (2013.01); *B60K 1/04* (2013.01); *B60L 53/16* (2019.02); *B60L 53/18* (2019.02); *H01R 13/73* (2013.01); *H01R 13/74* (2013.01); *H02G 3/22* (2013.01); *B60K 2001/0438* (2013.01); *H01R 2201/26* (2013.01)

(58) Field of Classification Search
CPC .... B60R 16/0215; H01R 13/73; H01R 13/74; H01R 13/745; H01R 13/748; H01R 2201/26
USPC .............................................. 296/208, 97.22
See application file for complete search history.

(56) References Cited

U.S. PATENT DOCUMENTS

| | | |
|---|---|---|
| 9,079,504 B2 | 7/2015 | Amano et al. |
| 9,774,213 B2 * | 9/2017 | Ozaki ..................... H01F 27/08 |
| 2012/0268062 A1 | 10/2012 | Yoneda |

(Continued)

FOREIGN PATENT DOCUMENTS

| | | |
|---|---|---|
| CN | 104823331 A | 8/2015 |
| EP | 2922152 A1 | 9/2015 |

(Continued)

*Primary Examiner* — Dennis H Pedder
(74) *Attorney, Agent, or Firm* — Osha Bergman Watanabe & Burton LLP

(57) ABSTRACT

A wire harness routing structure for a chargeable vehicle includes a battery installed in the chargeable vehicle, a charging inlet for charging the battery, arranged on a vehicle body side part of the chargeable vehicle, and a wire harness connected to the battery and the charging inlet. A tip of the charging inlet to which the wire harness is connected is positioned inside a vehicle body passing through the vehicle body side part.

5 Claims, 9 Drawing Sheets

(51) Int. Cl.
*H01R 13/74* (2006.01)
*H02G 3/22* (2006.01)

(56) References Cited

U.S. PATENT DOCUMENTS

| | | |
|---|---|---|
| 2015/0034400 A1 | 2/2015 | Amano et al. |
| 2015/0217707 A1* | 8/2015 | Tanigaki ................ B60L 50/66 180/65.1 |
| 2015/0229055 A1 | 8/2015 | Fukushima et al. |

FOREIGN PATENT DOCUMENTS

| | | | |
|---|---|---|---|
| JP | 2009298263 | A | 12/2009 |
| JP | 2012111352 | A | 6/2012 |
| JP | 5119858 | B2 | 1/2013 |
| JP | 2014-099256 | A | 5/2014 |
| JP | 5853714 | B2 | 2/2016 |
| JP | 2018-165105 | A | 10/2018 |
| JP | 2019098917 | A | 6/2019 |
| WO | 2013/073327 | A1 | 5/2013 |
| WO | 2014/077196 | A1 | 5/2014 |
| WO | 2018179867 | A1 | 10/2018 |

* cited by examiner

WIRE HARNESS ROUTING STRUCTURE FOR CHARGEABLE VEHICLE

TECHNICAL FIELD

The present invention relates to a wire harness routing structure for a chargeable vehicle.

BACKGROUND ART

Patent Literature 1 discloses a structure in which a charging inlet is arranged outside a vehicle, and a wire harness connected to the charging inlet is routed inside the vehicle and connected to a power storage device installed in the vehicle.

CITATION LIST

Patent Literature

Patent Literature 1: WO 2018/179867

SUMMARY OF INVENTION

Technical Problem

The internal space of a vehicle has a complicated shape due to structural members and installed parts of the vehicle body, and thus a wire harness needs to be routed while being bent along the complicated shape of the internal space, leading to an issue with routing workability.

It is thus an object of the present invention to enhance the routing workability within a vehicle of a wire harness connected to a charging inlet.

Solution to Problem

A wire harness routing structure for a chargeable vehicle according to one aspect of the present invention includes a wire harness that connects a battery installed in the vehicle and a charging inlet arranged on a vehicle body side part of the vehicle. A tip of the charging inlet to which the wire harness is connected is positioned inside the vehicle passing through the vehicle body side part.

Advantageous Effects of Invention

According to the present invention, it is possible to enhance the routing workability within a vehicle of a wire harness connected to a charging inlet.

An embodiment of the present invention is described below with reference to the drawings.

Figure 1:
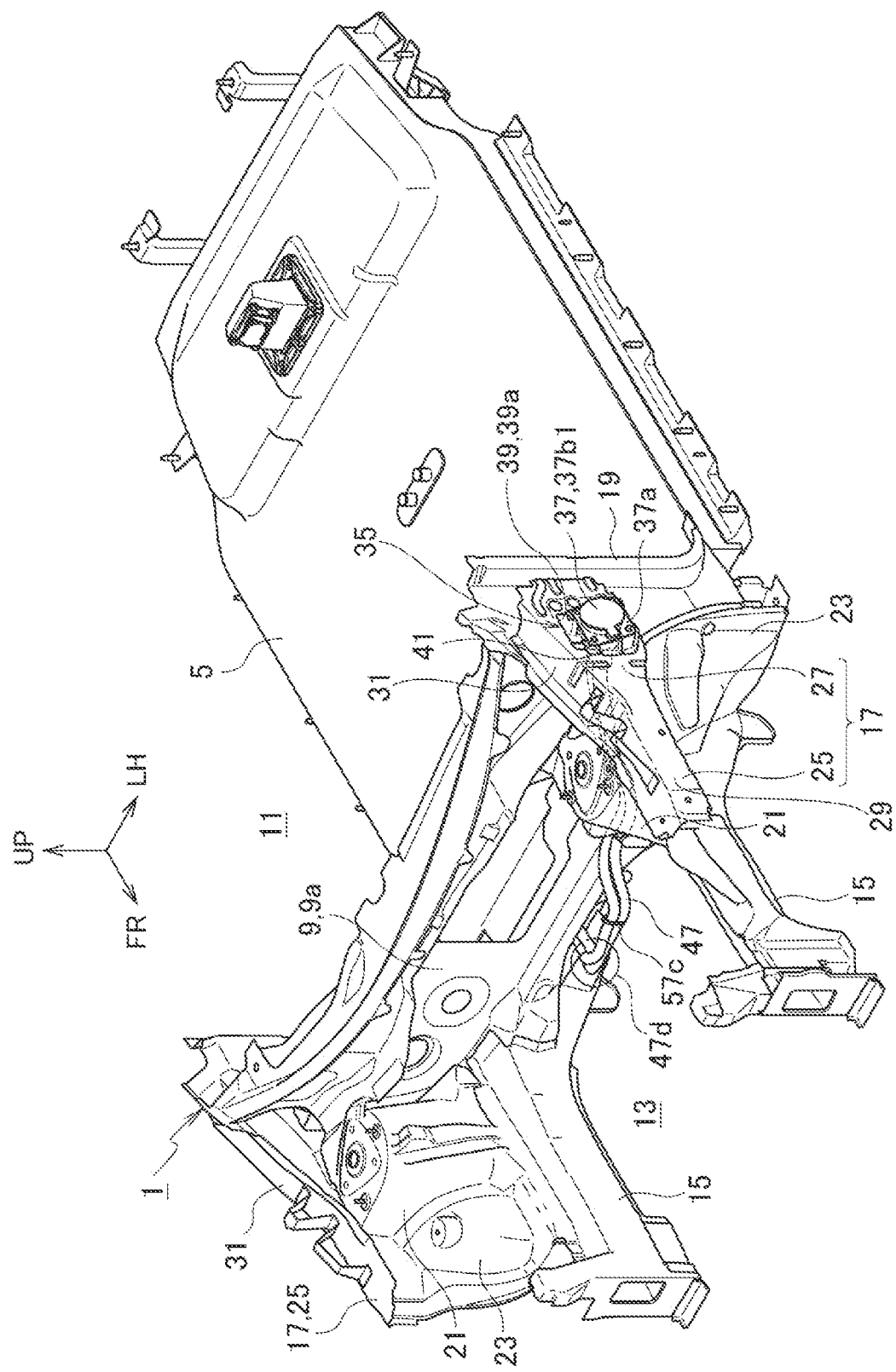
FIG. 1 is a perspective view of a wire harness routing structure for a chargeable vehicle according to an embodiment, in which a floor panel is omitted.

FIG. 1 illustrates a wire harness routing structure for a chargeable vehicle according to an embodiment. Here, an electric vehicle is described as the chargeable vehicle. FIG. 1 omits some vehicle body members such as a floor panel 3 of a vehicle body 1 from FIG. 2 and thus illustrates a battery unit 5 arranged below the floor panel 3. The battery unit 5 constitutes a battery installed in the vehicle. The battery unit 5 may be referred to simply as the battery 5 below. The directions indicated by the arrows FR, UP, and LH in the figures are the front of the vehicle, the upper side of the vehicle, and the left side of the vehicle, respectively.

Figure 2:
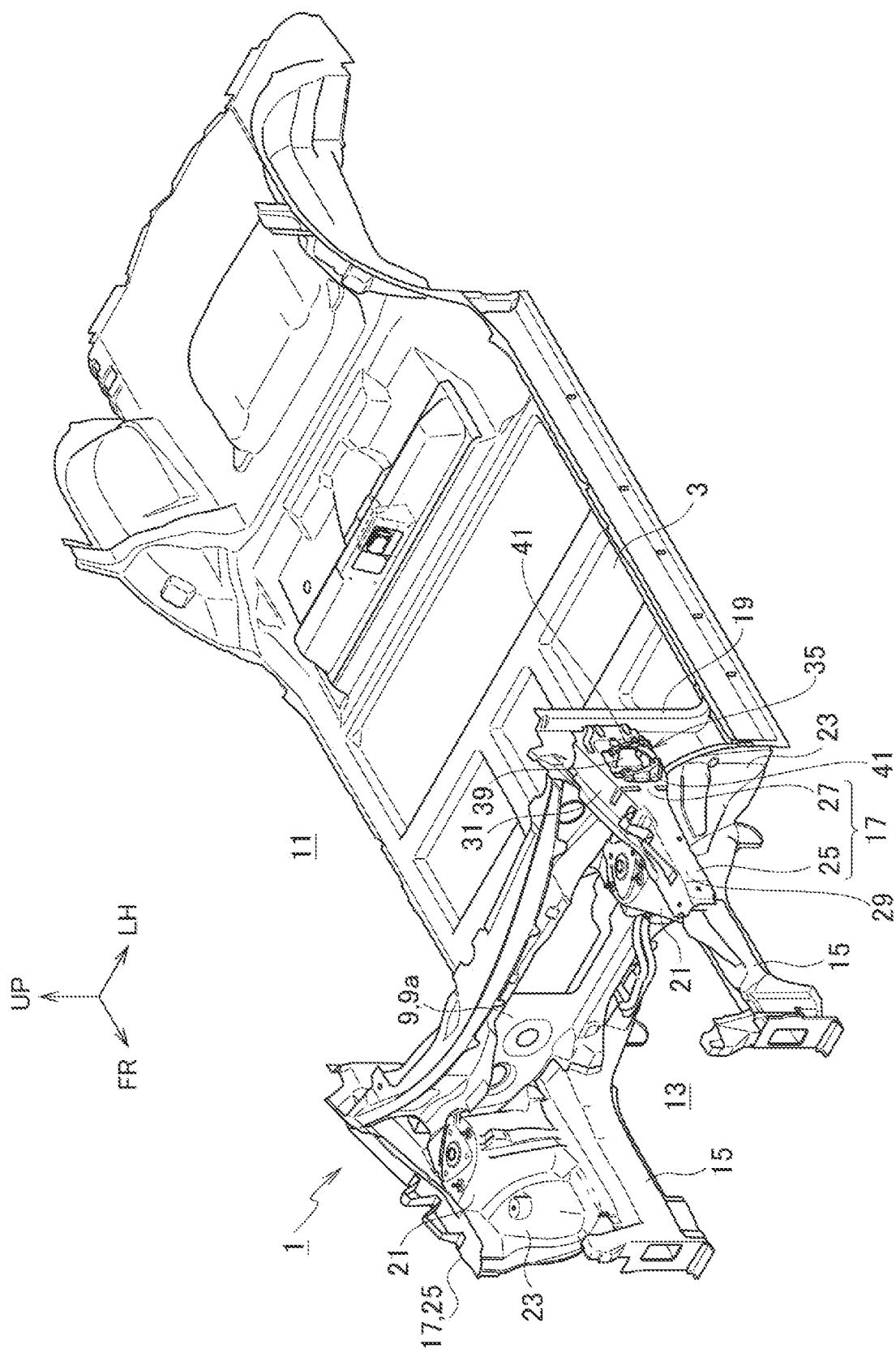
FIG. 2 is a perspective view of a vehicle body with a floor panel added to and a wire harness and a charging inlet removed from FIG. 1.

As illustrated in FIG. 2, a dash panel 9 is arranged in front of the floor panel 3. The dash panel 9 is arranged in front of a vehicle compartment 11 and serves as a partition separating the vehicle compartment 11 and a motor room 13 in front. Front side members 15 extend in the vehicle longitudinal direction on both sides in the vehicle width direction at the lower part of the motor room 13. The lower part of the dash panel 9 inclines rearward. The rear parts of the front side members 15 bend downward along the above-described inclination of the dash panel 9, and the bent parts are connected to the above-described inclining part of the dash panel 9.

A hood ridge panel 17 as a vehicle body side part is arranged above each of the front side members 15 in the motor room 13 and slightly outside in the vehicle width direction. The rear parts of the hood ridge panels 17 are connected to front pillars 19 extending in the vertical direction. A strut tower 21 and a wheel house 23 are arranged inside each hood ridge panel 17 in the vehicle width direction. The front part of the strut tower 21 and the rear part of the wheel house 23 are connected to each other. The strut tower 21 and the wheel house 23 each have the upper part connected to the hood ridge panel 17 and the lower part connected to the front side member 15.

Figure 4:
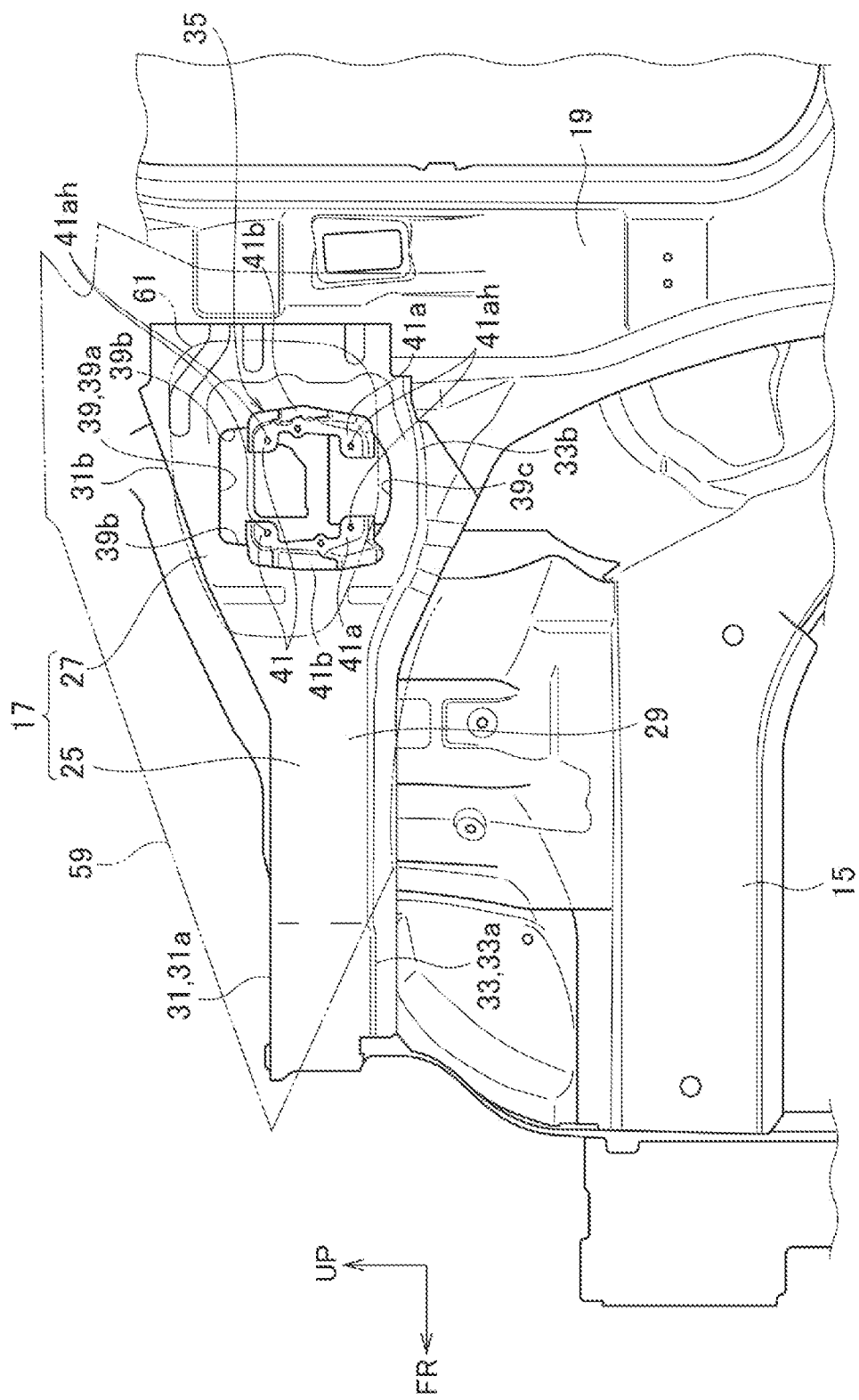
FIG. 4 is a side view of the periphery of the charging inlet mourning portion of the vehicle body in FIG. 3.
Figure 5:
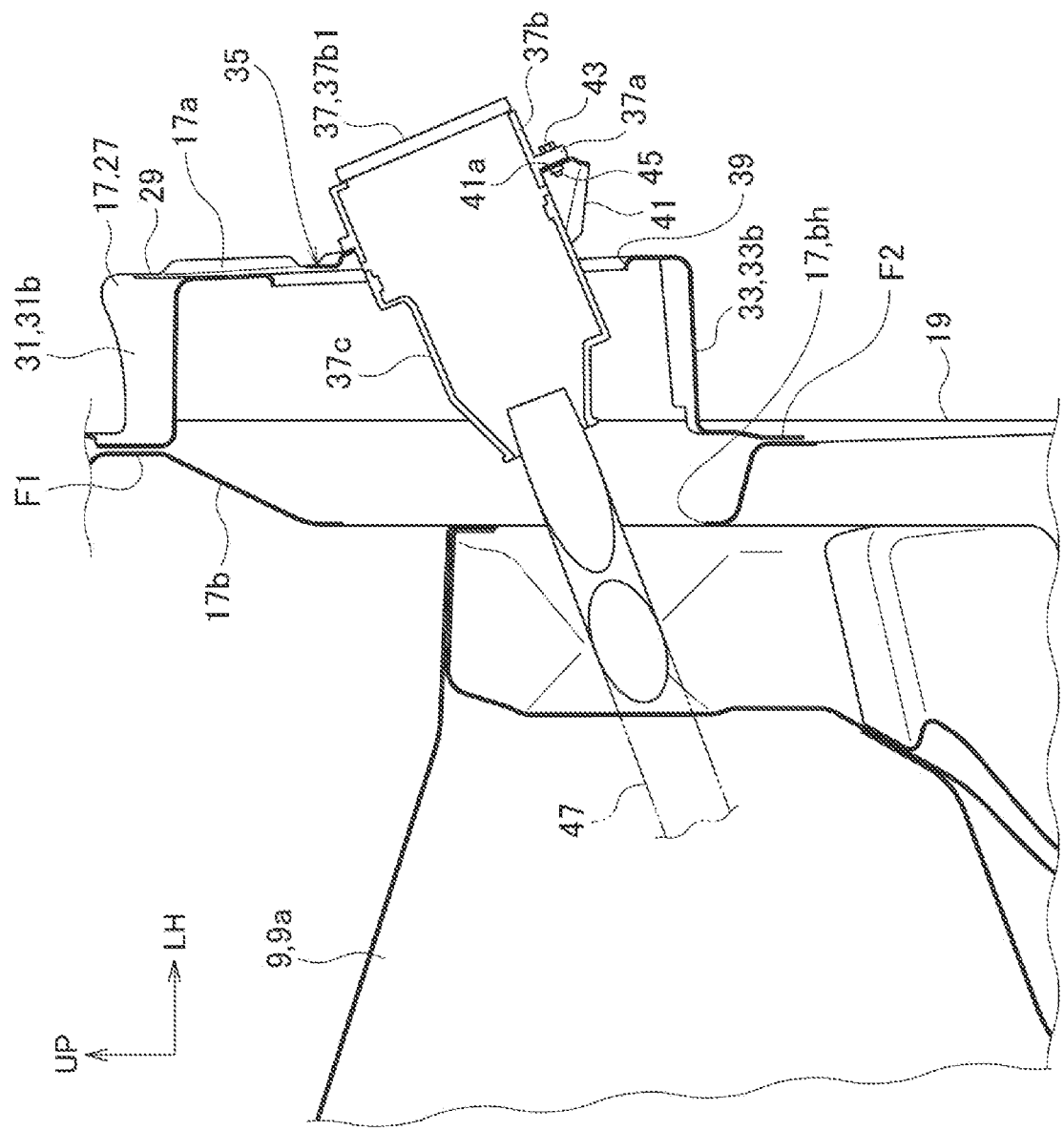
FIG. 5 is a cross-sectional view of the charging inlet mounting portion in FIG.

Each hood ridge panel 17 includes a front part 25 positioned in the vicinity of the strut tower 21 toward the front and a rear part 27 positioned in the vicinity of the strut tower 21 toward the rear. As illustrated in FIG. 4, the front part 25 extends longitudinally, and the rear part 27 extends vertically from the rear end of the front part 25 to be connected to the front pillar 19 described above. The hood ridge panel 17 includes a side surface 29, an upper surface 31, and a lower surface 33 over its entire length including the front part 25 and the rear part 27. As illustrated in FIG. 5, the hood ridge panel 17 includes an outer panel 17a and an inner panel 17b, which are joined to each other at upper and lower flange joints F1, F2 to form a closed cross section. The side surface 29, the upper surface 31, and the lower surface 33 are each formed on the outer panel 17a.

As illustrated in FIG. 4, a front upper surface 31a and a front lower surface 33a of the front part 25 are horizontal planes parallel to each other. A rear upper surface 31b of the rear part 27 inclines so that the height in the vertical direction gradually increases from near the front part 25 toward the rear. A rear lower surface 33b of the rear part 27 inclines so that the height in the vertical direction gradually decreases from near the front part 25 toward the rear and curves in a gentle manner so that a part thereof near the front pillar 19 becomes convex downward.

A charging inlet mounting portion 35 is arranged on the side surface 29 between the rear upper surface 31b and the curved part of the rear lower surface 33b. A charging inlet 37 illustrated in FIGS. 1 and 5 is mounted on the charging inlet mounting portion 35. The charging inlet 37 is for charging the battery 5. The charging inlet mounting portion 35 includes a through hole 39 penetrating the side surface 29 and brackets 41 arranged on the side surface 29 outside in the vehicle width direction at the periphery of the through hole 39. The brackets 41 may be integral with or separate from the side surface 29.

The through hole 39 includes an upper edge 39a linearly extending in the longitudinal direction, a pair of front and rear side edges 39b linearly extending downward from both front and rear ends of the upper edge 39a, and a lower edge 39c connecting the lower ends of the pair of front and rear side edges 39b. The lower edge 39c is curved to be convex downward. The brackets 41 are each arranged along the pair of front and rear side edges 39b. As illustrated in FIG. 4, the pair of front and rear brackets 41 is substantially symmetrical in a side view.

Figure 3:
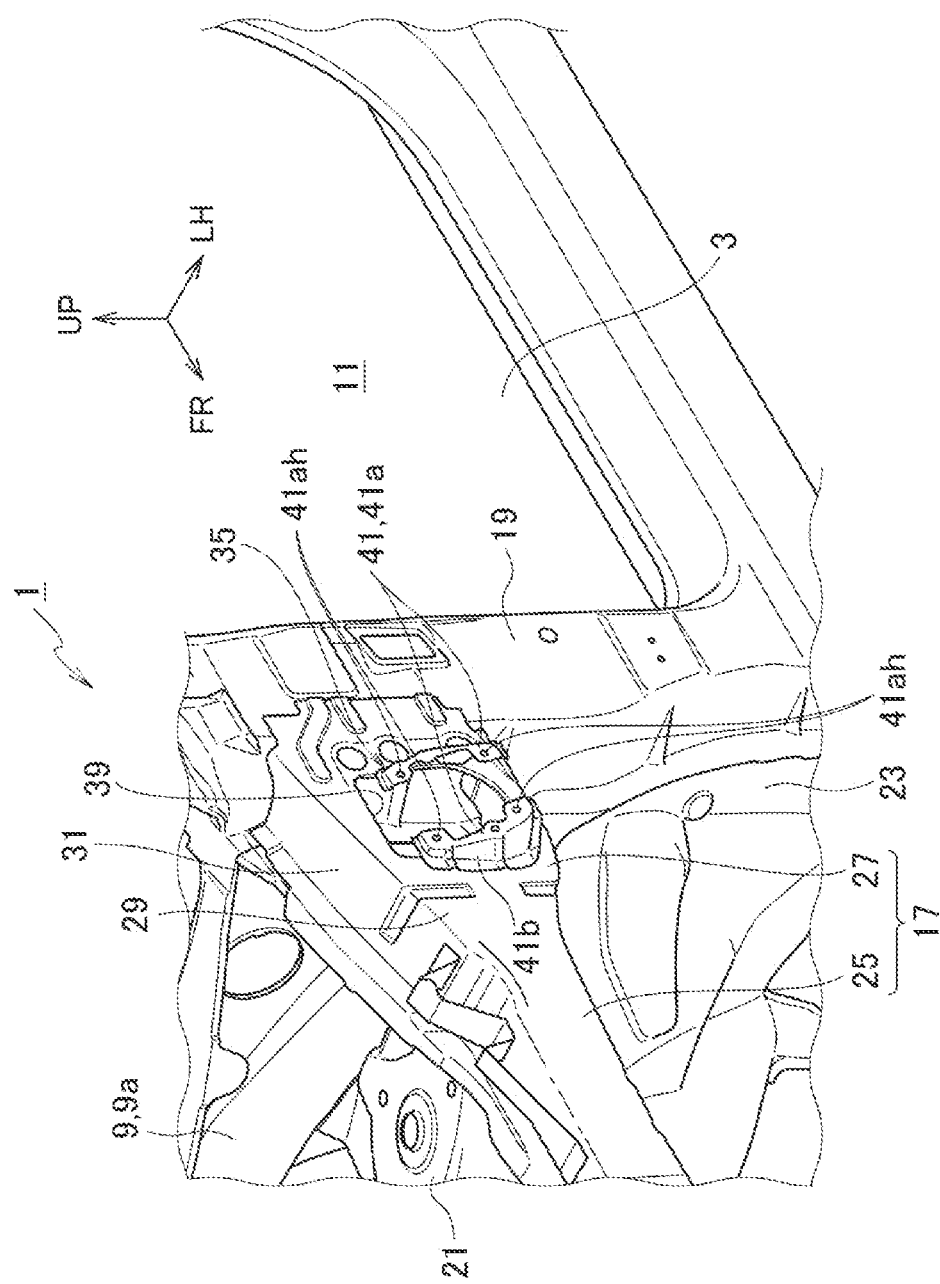
FIG. 3 is a perspective view of the periphery of a charging inlet mounting portion in FIG. 2.

As illustrated in FIGS. 3 and 5, the pair of front and rear brackets 41 inclines so that mounting surfaces 41a on the outside in the vehicle width direction project outward in the vehicle width direction more at the lower part thereof than at the upper part thereof. The pair of front and rear brackets 41 includes a pair of front and rear side wall surfaces 41b rising from the side surface 29. The pair of front and rear mounting surfaces 41a is formed to bend in the direction in which they are opposed to each other, from the outside edges in the vehicle width direction of the pair of front and rear side wall surfaces 41b. The space between the pair of front and rear brackets 41 is aligned with the through hole 39. Two upper and lower mounting holes 41ah are formed in each of the pair of front and rear mounting surfaces 41a.

The charging inlet 37 is inserted between the pair of front and rear brackets 41 and into the through hole 39 from the outside of the vehicle body to be mounted on the charging inlet mounting portion 35. The charging inlet 37 has a peripheral flange part 37a abutted against the mounting surface 41a while being inserted between the front and rear pair of brackets 41 and in the through hole 39. Here, flange mounting holes formed in the flange part 37a are aligned with the mounting holes 41ah, and a bolt 43 is inserted in each of the flange mounting holes and the mounting holes 41ah and then is fastened to a nut 45.

As illustrated in FIG. 5, the charging inlet 37 penetrates the outer panel 17a of the hood ridge panel 17 on the vehicle body side part, in a state of being mounted on the vehicle body 1. That is, in the charging inlet 37, a charging connector connection part 37b on the outside in the vehicle width direction is positioned outside the outer panel 17a, and a harness connection part 37c on the inside in the vehicle width direction is positioned inside the outer panel 17a. An opening and closing lid 37b1 is mounted in an operable and closable manner on the end part of the charging connector connection part 37b outside the vehicle body. With the opening and closing lid 37b1 in the open state, a charging connector pulled out from a charger, which is not illustrated, outside the vehicle is connected to the charging connector connection part 37b to charge the battery 5. One end of a wire harness 47 is connected to the harness connection part 37c.

In the charging inlet 37 mounted as illustrated in FIG. 5, the harness connection part 37c is positioned between the outer panel 17a and the inner panel 17b. Thus, the wire harness 47 penetrates an inner through hole 17bh formed in the inner panel 17b. The charging inlet 37 inclines so that the charging connector connection part 37b on the outside in the vehicle width direction is higher than the harness connection part 37c on the inside in the vehicle width direction in a state where the charging inlet 37 passes through the outer panel 17a of the hood ridge panel 17. The wire harness 47 having one end connected to the harness connection part 37c is routed downward inside the vehicle along the above-described inclination direction of the charging inlet 37.

Figure 7:
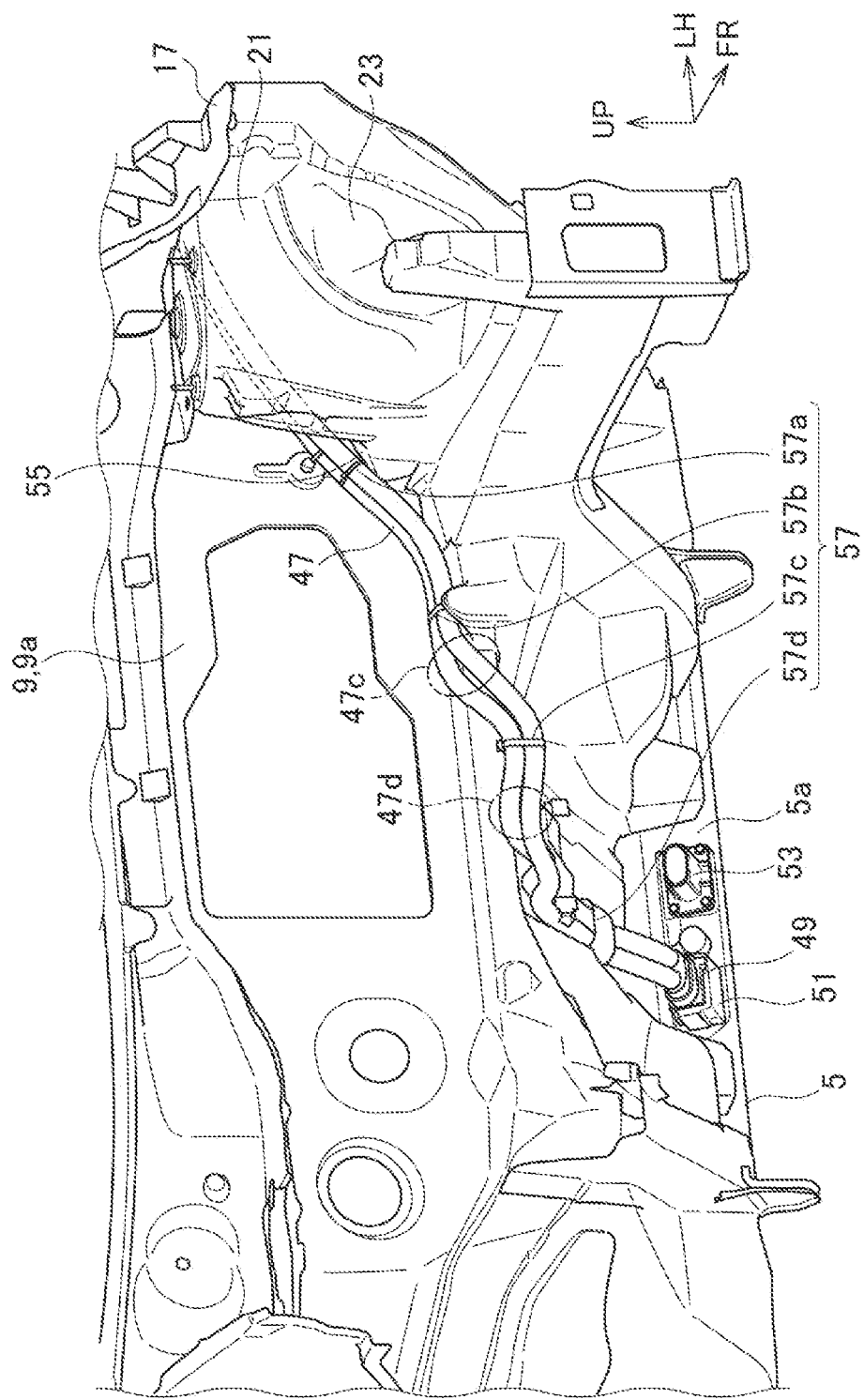
FIG. 7 is a perspective view of the wire harness routing structure in FIG. 1 as seen from the front of the vehicle.

As illustrated FIG. 7, a connector 49 is mounted on the other end of the wire harness 47. Meanwhile, the battery unit 5 is arranged with a battery-side connector 51 at the front end part thereof. The connector 49 of the wire harness 47 is connected to the battery-side connector 51. The front end part of the battery unit 5 including the part on which the battery-side connector 51 is mounted includes a battery inclining part 5a inclining so that the lower part thereof is more forward of the vehicle than the upper part thereof. The battery-side connector 51 is mounted on the battery inclining part 5a. Thus, a connection port of the battery-side connector 51 faces obliquely upward toward the front of the vehicle. Accordingly, the connector 49 of the wire harness 47 is connected to the battery-side connector 51 from the front of the vehicle toward the rear in an obliquely downward direction.

Figure 8:
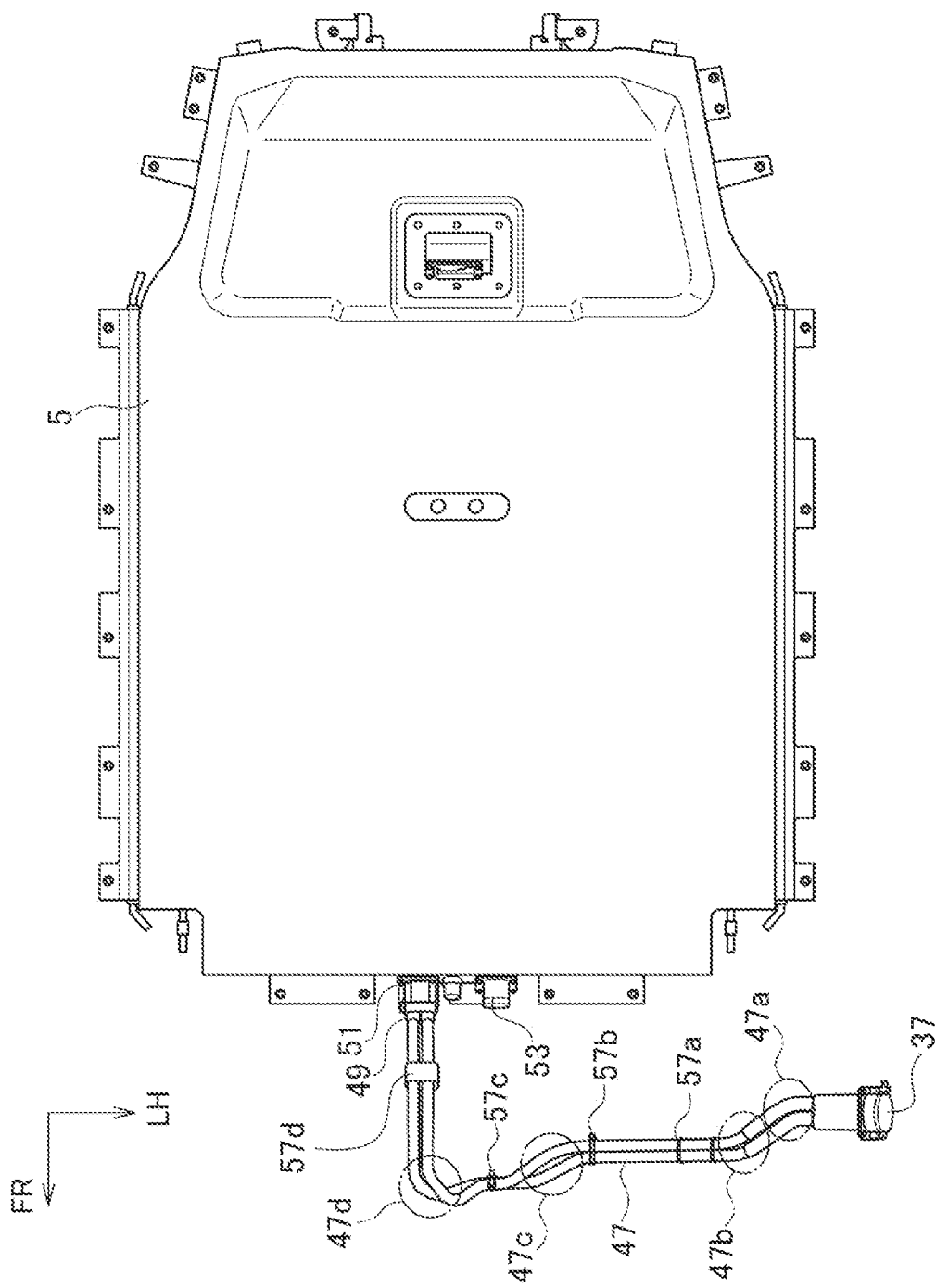
FIG. 8 is a plan view of a battery unit including the wire harness, illustrated in the wire harness routing structure in FIG. 1.

As illustrated in FIG. 8, the battery-side connector 51 is positioned near the center of the battery unit 5 in the vehicle width direction. Another connector 53 is arranged on the left side of the battery-side connector 51 in the vehicle width direction. A motor-side end of a wire harness, which is not illustrated, is connected to the connector 53.

Figure 6:
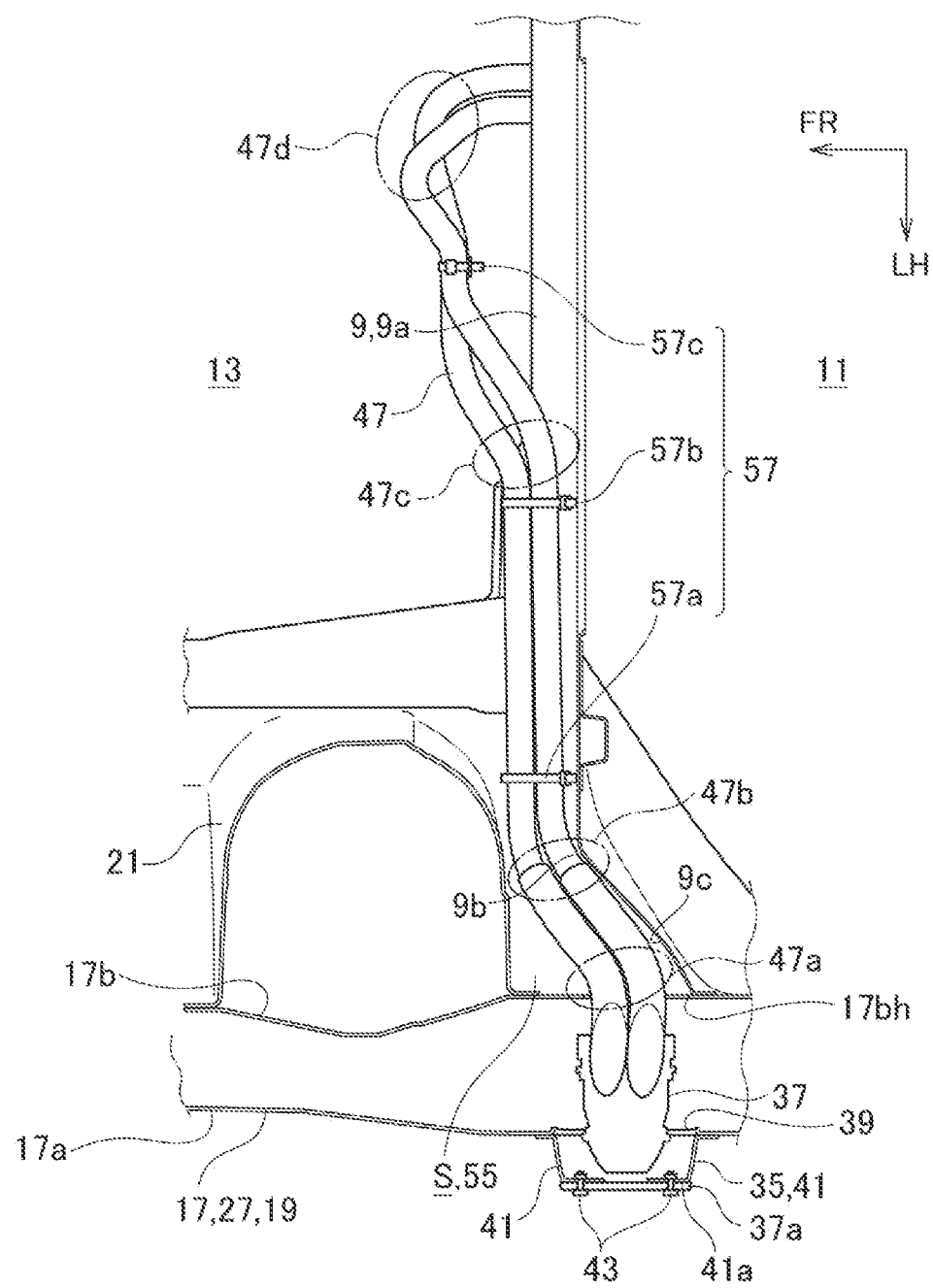
FIG. 6 is a plan view of the wire harness routing structure in FIG. 1.

As illustrated in FIG. 6, the dash panel 9 includes a front protruding part 9a that is positioned adjacent to a center of the dash panel 9 in the vehicle width direction and protrudes more toward the front of the vehicle body than a different part, of the dash panel 9, on a side where the charging inlet 37 is arranged. The charging inlet 37 is positioned closer to the rear of the vehicle body than the front protruding part 9a. The wire harness 47 is connected to the battery unit 5 toward the rear of the vehicle body at a position corresponding to the front protruding part 9a in the vehicle width direction.

The front protruding part 9a has a surface substantially perpendicular to the vehicle body longitudinal direction and substantially parallel to the vehicle width direction. The dash panel 9 includes, closer to the end where the charging inlet 37 is arranged than the front protruding part 9a, a vehicle-width-direction inclining part 9c that bends at a bent part 9b and inclines toward the rear of the vehicle body. An end part of the vehicle-width-direction inclining part 9c opposite to the front protruding part 9a is joined to the inner panel 17b of the hood ridge panel 17. The connection part of the vehicle-width-direction inclining part 9c to the hood ridge panel 17 is positioned closer to the rear of the vehicle body than the charging inlet 37.

The charging inlet 37 is arranged at a position corresponding to the vehicle-width-direction inclining part 9c in the vehicle body longitudinal direction. Thus, in the plan view in FIG. 6, the wire harness 47 pulled into the vehicle through the charging inlet 37 bends toward the front of the vehicle body along the vehicle-width-direction inclining part 9c, passes over the bent part 9b, and is then routed toward the inside in the vehicle width direction along the front surface of the front protruding part 9a.

A region S where the wire harness 47 is routed is provided between the front protruding part 9a near the bent part 9b and the vehicle-width-direction inclining part 9c of the dash panel 9; and the strut tower 21. The wire harness 47 pulled out through the charging inlet 37 is routed in the region S. An inclining surface 55 as a vertical-direction inclining part is formed on the vehicle body member in the region S. The inclining surface 55 inclines from adjacent to the charging inlet 37 toward the center in the vehicle width direction so that the height in the vertical direction gradually decreases. The inclining surface 55 has one end near the front of the vehicle body connected to the strut tower 21 and the other end near the rear of the vehicle body connected to the dash panel 9.

The inclination angle of the inclining surface 55 when viewed from the vehicle body longitudinal direction is substantially equal to the inclination angle of the charging inlet 37 when viewed from the vehicle body longitudinal direction. That is, the wire harness 47 pulled out through the charging inlet 37 is routed obliquely downward along the inclining surface 55 straight from the inclination direction of the charging inlet 37 when viewed from the vehicle body longitudinal direction. As illustrated in FIGS. 6 and 7, the wire harness 47 is fixed using fixtures 57 (57a to 57d) to the dash panel 9 at multiple points with appropriate intervals along the route direction.

As illustrated in FIG. 7, when viewed from the front of the vehicle, the wire harness 47 is routed in a gradual downward inclination from one end to which the charging inlet 37 on the left side in the vehicle width direction (the right side in FIG. 7) is connected to the other end connected to the battery unit 5. As illustrated in FIG. 6, in a plan view, the wire harness 47 bends toward the front of the vehicle at a first bent part 47a near one end to which the charging inlet 37 is connected, then bends toward the inside in the vehicle width direction at a second bent part 47b, and is routed toward the center in the vehicle width direction along the front surface of the front protruding part 9a.

The wire harness 47 further slightly bends toward the front of the vehicle at a third bent part 47c corresponding to the vicinity of the fixture 57b in the front surface of the front protruding part 9a, and is routed obliquely right toward the front of the vehicle. In a plan view illustrated in FIG. 6, the wire harness 47 bends toward the rear of the vehicle at an angle of approximately 90 degrees at a fourth bent part 47d in front of the battery-side connector 51. Note that the bend angles of the first bent part 47a, the second bent part 47b, and the third bent part 47c in a plan view are all obtuse angles of about 150 degrees.

When the wire harness 47 bends toward the rear of the vehicle at the fourth bent part 47d in the plan view, the wire harness 47 previously bends toward the front of the vehicle at the first bent part 47a and the third bent part 47c with the formation of the front protruding part 9a. Thus, the bend angle at the fourth bent part 47d is suppressed to be smaller. The wire harness 47 between the fourth bent part 47d and the connector 49 is routed along the inclining part in the lower part of the dash panel 9. The wire harness 47 is fixed with the fixture 57d at the lower inclining part of the dash panel 9. That is, the wire harness 47 inclines obliquely downward toward the rear of the vehicle from the fourth bent part 47d toward the connector 49.

Figure 9:
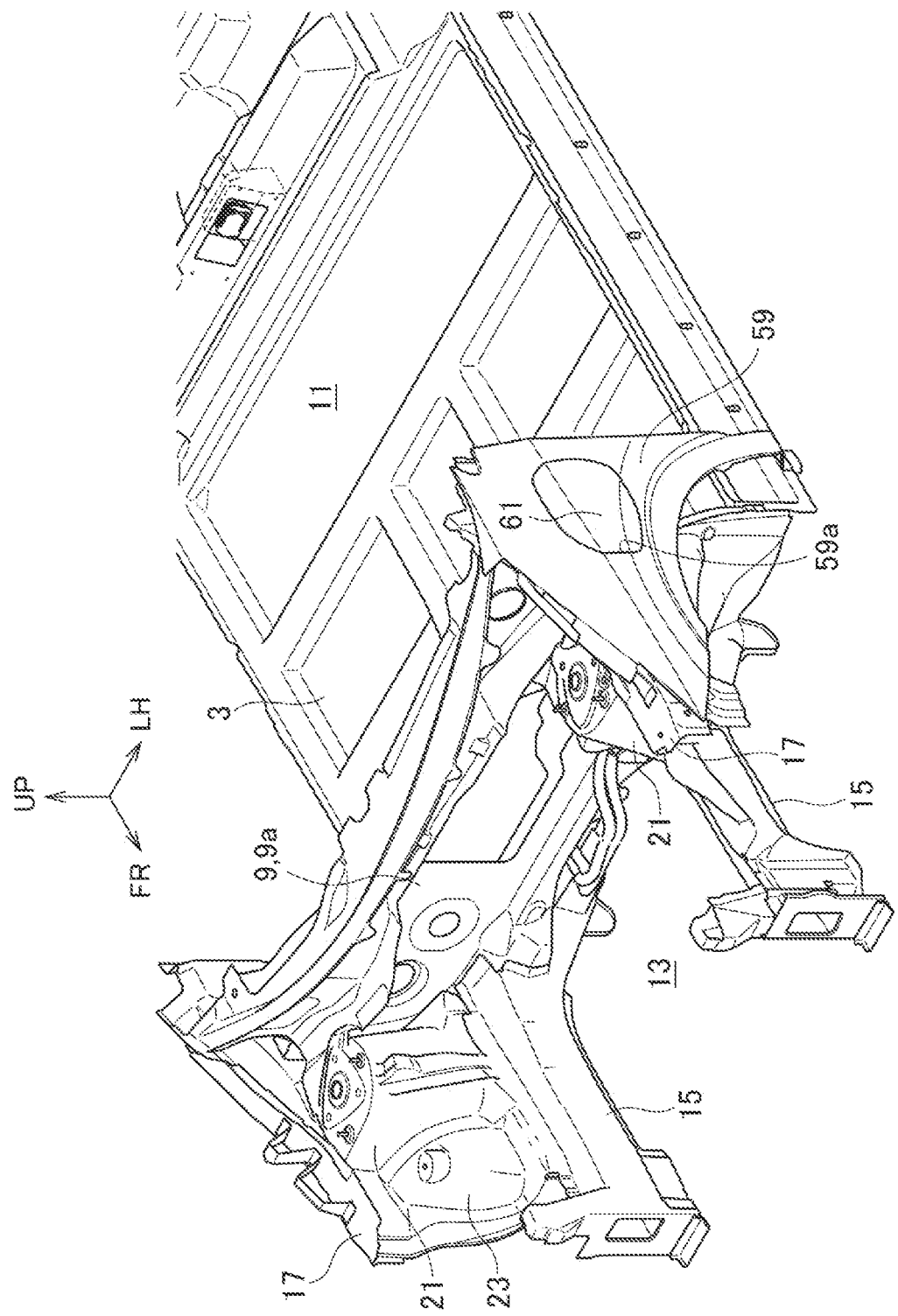
FIG. 9 is a perspective view of the vehicle body in FIG. 2 with a front fender panel added al a position corresponding to the charging inlet of the vehicle body.

In FIG. 9, a front fender panel 59 serving as a vehicle body outer plate is added to FIG. 2. An opening part 59a is formed in the front fender panel 59 at a position corresponding to the charging inlet 37. A lid 61, which can be opened and closed, is arranged on the opening part 59a. By opening the lid 61, the charging inlet 37 is exposed to the outside through the opening part 59a. In this state, a charging connector of a charger, which is not illustrated, is connected to the charging inlet 37 for charging.

The wire harness 47 is mounted on the vehicle body with the charging inlet 37 connected thereto. At that time, the connector 49 end of the wire harness 47 is inserted into the vehicle through the through hole 39 of the charging inlet mounting portion 35 and the inner through hole 17bh from the state illustrated in FIGS. 3 and 4. Here, the connector 49 and the wire harness 47 are guided to slide on the inclining surface 55 in the region S and are inserted downward toward the center in the vehicle width direction. At the time of insertion, the work of pulling the wire harness 47 from the inside of the vehicle is also performed. After the connector 49 and the wire harness 47 are inserted into the vehicle, the charging inlet 37 is fixed to the bracket 41 of the charging inlet mounting portion 35, and the wire harness 47 is fixed to the vehicle body with the fixtures 57. Then, the connector 49 is connected to the battery-side connector 51 of the battery unit 5 installed in the vehicle body.

Next, the operation and effect of the embodiment are described.

The present embodiment includes the battery unit 5 installed in a vehicle, the charging inlet 37 arranged on the hood ridge panel 17 on the vehicle body side part for charging the battery unit 5, and the wire harness 47 connected to the battery unit 5 and the charging inlet 37. A tip of the charging inlet 37 to which the wire harness 47 is connected penetrates the inner panel 17b of the hood ridge panel 17 and is positioned inside the vehicle.

This enables the wire harness 47 to be pulled in and routed almost linearly from the tip of the charging inlet 37 positioned inside the inner panel 17b toward the inside of the vehicle as it is. This improves the routing workability of the wire harness 47 and also shortens the overall length of the wire harness 47 to achieve a reduction in material cost.

The charging inlet 37 according to the present embodiment is arranged at a position corresponding to the motor room 13 in front of the dash panel 9, and the dash panel 9 includes the front protruding part 9a that is positioned adjacent to the center of the dash panel 9 in the vehicle width direction and protrudes more toward the front of the vehicle body than the different part, of the dash panel 9, where the charging inlet 37 is arranged. The charging inlet 37 is positioned closer to the rear of the vehicle body than the front protruding part 9a, and the wire harness 47 is connected to the battery unit 5 from the front of the vehicle body at a position corresponding to the front protruding part 9a in the vehicle width direction.

Here, the wire harness 47 pulled into the vehicle through the charging inlet 37 is temporarily displaced forward of the vehicle body due to the presence of the front protruding part 9a. This makes the curvature at the fourth bent part 47d smaller and enhances the routing workability of the wire harness 47, which is thick and hard to bend.

The dash panel 9 according to the present embodiment includes the vehicle-width-direction inclining part 9c inclining so that one end adjacent to the charging inlet 37 is positioned to the rear of the vehicle body with respect to the front protruding part 9a that is substantially parallel to the vehicle width direction. This enables the wire harness 47 pulled into the vehicle through the charging inlet 37 to be directed in a gentle manner to the front of the vehicle along the vehicle-width-direction inclining part 9c.

In the present embodiment, the region S where the wire harness 47 is routed is provided between the dash panel 9 and the strut tower 21 positioned closer to the front of the vehicle body than the dash panel 9. When the charging inlet 37 and the wire harness 47 are mounted on the vehicle body, the connector 49 end of the wire harness 47 having the charging inlet 37 connected thereto is inserted into the vehicle through the through hole 39 of the charging inlet mounting portion 35 and the inner through hole 17*bh*. Although the inside of the vehicle is difficult for the operator to see from the outside of the vehicle, providing the region S facilitates the routing work of the wire harness 47.

The battery 5 according to the present embodiment is positioned lower in the vertical direction than the connection part of the wire harness 47 connecting to the charging inlet 37. The vehicle body member in the region S in which the wire harness 47 is routed includes the inclining surface 55 whose height in the vertical direction gradually decreases from adjacent to the charging inlet 37 toward the center in the vehicle width direction. Thus, when the connector 49 end of the wire harness 47 is inserted into the vehicle through the through hole 39 of the charging inlet mounting portion 35 and the inner through hole 17*bh*, it is possible to slide and push the wire harness 47 on the inclining surface 55 and to facilitate the routing work.

The battery 5 according to the present embodiment is arranged lower in the vertical direction than the connection part of the wire harness 47 connecting to the charging inlet 37, and the part of the battery unit 5 to which the wire harness 47 is connected faces obliquely upward toward the front of the vehicle body. This enables the connector 49 of the wire harness 47 to be connected to the battery-side connector 51 obliquely downward from the front toward the rear of the vehicle and thus facilitates the connection work.

In the above-described embodiment, the charging inlet 37 is mounted on the left side of the vehicle, which is on the passenger seat side. In this case, the charging inlet 37 is for rapid charging, and a charging inlet for normal charging is mounted on the right side of the vehicle, which is on the vehicle body on the driver's seat side.

Although an embodiment according to the present invention is described above, the embodiment is just an example to facilitate understanding of the present invention, and the present invention is not limited to the embodiment. The technical scope of the present invention is not limited to the specific technical matters disclosed in the above embodiment, and also includes various alternations, modifications, and technical substitutions easily derived therefrom.

For example, although the charging inlet 37 is mounted on the left side of the vehicle in the above-described embodiment, the charging inlet 37 may be mounted on the right side of the vehicle. In this case, the driver's seat is on the left side of the vehicle.

REFERENCE SIGNS LIST

1 Vehicle body
5 Battery unit (battery)
9 Dash panel
9*a* Front protruding part of dash panel
9*c* Vehicle-width-direction inclining part of dash panel
13 Motor room
17 Hood ridge panel (vehicle body side part)
21 Strut tower
37 Charging inlet
47 Wire harness
55 Inclining surface (vertical inclining part)
S Region where wire harness is routed

The invention claimed is:

1. A wire harness routing structure for a chargeable vehicle, comprising
a battery installed in the chargeable vehicle;
a charging inlet for charging the battery, arranged on a vehicle body side part of the chargeable vehicle; and
a wire harness connected to the battery and the charging inlet, wherein
a tip of the charging inlet to which the wire harness is connected is positioned inside the chargeable vehicle passing through the vehicle body side part, and
the charging inlet is arranged at a position corresponding to a motor room in front of a dash panel, the dash panel includes a front protruding part that is positioned adjacent to a center of the dash panel in a vehicle width direction and protrudes more toward a front of a vehicle body than a different part, of the dash panel, where the charging inlet is arranged, the charging inlet is positioned closer to a rear of the vehicle body than the front protruding part, and the wire harness is connected to the battery at a position corresponding to the front protruding part in the vehicle width direction.

2. The wire harness routing structure for a chargeable vehicle according to claim 1, wherein
the dash panel includes a vehicle-width-direction inclining part that inclines so that one end adjacent to the charging inlet is positioned to the rear of the vehicle body with respect to the front protruding part, which is parallel to the vehicle width direction.

3. The wire harness routing structure for a chargeable vehicle according to claim 1, wherein
a region for routing the wire harness is provided between the dash panel and a strut tower positioned closer to the front of the vehicle body than the dash panel.

4. The wire harness routing structure for a chargeable vehicle according to claim 3, wherein
the battery is arranged at a position lower in a vertical direction than a connection part of the wire harness connecting to the charging inlet, and a vehicle body member in the region for routing the wire harness includes a vertical inclining part that inclines so that a vertical height gradually decreases from adjacent to the charging inlet toward the center in the vehicle width direction.

5. The wire harness routing structure for a chargeable vehicle according to claim 1, wherein
the battery is arranged at a position lower in a vertical direction than a connection part of the wire harness connecting to the charging inlet, and a portion of the battery, to which the wire harness is connected, faces obliquely upward toward a front of the vehicle body.

* * * * *